(12) United States Patent
Angell

(10) Patent No.: US 8,132,097 B2
(45) Date of Patent: Mar. 6, 2012

(54) COMPUTER-IMPLEMENTED SYSTEM FOR CREATING A PUBLICATION AND METHOD THEREOF

(75) Inventor: Matthew Jason Angell, Kansas City, MO (US)

(73) Assignee: Saepio Technologies, Inc., Kansas City, MO (US)

( * ) Notice: Subject to any disclaimer, the term of this patent is extended or adjusted under 35 U.S.C. 154(b) by 442 days.

(21) Appl. No.: 12/140,904

(22) Filed: Jun. 17, 2008

(65) Prior Publication Data

US 2009/0249195 A1 Oct. 1, 2009

Related U.S. Application Data

(63) Continuation-in-part of application No. 11/099,321, filed on Apr. 4, 2005, now abandoned, which is a continuation of application No. 09/419,360, filed on Oct. 15, 1999, now Pat. No. 6,931,591.

(51) Int. Cl.
*G06F 17/00* (2006.01)
(52) U.S. Cl. ......................... 715/243; 715/253; 705/7.13
(58) Field of Classification Search .................. 715/243, 715/253; 705/7.13
See application file for complete search history.

(56) References Cited

U.S. PATENT DOCUMENTS

| | | | |
|---|---|---|---|
| 5,214,755 A | 5/1993 | Mason | |
| 5,241,464 A | 8/1993 | Greulich et al. | |
| 5,337,406 A | 8/1994 | Takakura et al. | |
| 5,381,523 A | 1/1995 | Hayashi et al. | |
| 5,459,827 A | 10/1995 | Allouche et al. | |
| 5,475,805 A | 12/1995 | Murata | |
| 5,535,320 A | 7/1996 | Gay et al. | |
| 5,555,362 A | 9/1996 | Yamashita et al. | |

(Continued)

FOREIGN PATENT DOCUMENTS

EP 0814425 A2 12/1997

(Continued)

OTHER PUBLICATIONS

Adobe Systems Inc., Adobe Photoshop 3.0, "User Guide," 1994, pp. 129-133.

*Primary Examiner* — Stephen Hong
*Assistant Examiner* — Matthew Ludwig
(74) *Attorney, Agent, or Firm* — Bryan Cave LLP

(57) ABSTRACT

In some embodiments, a computer-implemented system can be configured to facilitate creation of a publication from a master template, one or more embedded templates, and one or more content components. The computer-implemented system can include: (a) an administrative toolkit having: (1) a master template creation module configured to create and allow editing of the master template at a development site accessible to a template creator; (2) an embedded template creation module configured to create and allow editing of the one or more embedded templates at the development site by the template creator; (3) a content management module configured to establish rules regarding editing of the master template and placing the one or more content components in the master template; (4) an embedded template management module configured to establish rules regarding the editing of the one or more embedded templates, the placing the one or more embedded templates in the master template, and the placing the one or more content components in the one or more embedded templates; and (5) a template inventory management module configured to copy the master template from the development site to a production site accessible to an end-user. Other embodiments are disclosed in this application.

12 Claims, 14 Drawing Sheets

U.S. PATENT DOCUMENTS

| | | | |
|---|---|---|---|
| 5,577,189 A | 11/1996 | Gay et al. | |
| 5,644,776 A | 7/1997 | DeRose et al. | |
| 5,649,216 A | 7/1997 | Sieber | |
| 5,671,429 A | 9/1997 | Tanaka | |
| 5,745,122 A | 4/1998 | Gay et al. | |
| 5,748,963 A | 5/1998 | Orr | |
| 5,796,401 A | 8/1998 | Winer | |
| 5,822,587 A | 10/1998 | McDonald et al. | |
| 5,845,302 A | 12/1998 | Cyman, Jr. et al. | |
| 5,845,303 A | 12/1998 | Templeman | |
| 5,890,175 A | 3/1999 | Wong et al. | |
| 5,895,475 A | 4/1999 | Eisenberg | |
| 5,895,477 A | 4/1999 | Orr et al. | |
| 5,897,622 A | 4/1999 | Blinn et al. | |
| 5,900,003 A | 5/1999 | Ben Dror | |
| 5,903,905 A | 5/1999 | Andersen et al. | |
| 5,911,146 A * | 6/1999 | Johari et al. | 715/234 |
| 5,930,810 A | 7/1999 | Farros et al. | |
| 5,930,811 A | 7/1999 | Nojima et al. | |
| 5,953,733 A | 9/1999 | Langford-Wilson | |
| 5,995,724 A | 11/1999 | Mikkelsen et al. | |
| 6,002,833 A | 12/1999 | Abecassis | |
| 6,105,044 A | 8/2000 | DeRose et al. | |
| 6,125,374 A | 9/2000 | Terry et al. | |
| 6,134,565 A | 10/2000 | Hommersom et al. | |
| 6,161,114 A | 12/2000 | King et al. | |
| 6,185,589 B1 | 2/2001 | Votipka | |
| 6,233,618 B1 | 5/2001 | Shannon | |
| 6,356,903 B1 | 3/2002 | Baxter et al. | |
| 6,526,423 B2 | 2/2003 | Zawadzki et al. | |
| 6,584,480 B1 | 6/2003 | Ferrel et al. | |
| 6,589,292 B1 | 7/2003 | Langford-Wilson et al. | |
| 6,596,032 B2 | 7/2003 | Nojima et al. | |
| 6,813,746 B1 * | 11/2004 | O'Shea | 715/234 |
| 6,826,727 B1 | 11/2004 | Mohr et al. | |
| 6,931,591 B1 | 8/2005 | Brown et al. | |
| 7,194,424 B2 | 3/2007 | Greer et al. | |
| 7,240,025 B2 | 7/2007 | Stone et al. | |
| 2004/0078373 A1 | 4/2004 | Ghoneimy et al. | |

FOREIGN PATENT DOCUMENTS

| | | |
|---|---|---|
| WO | WO 98/04988 | 2/1998 |
| WO | WO 98/10356 | 3/1998 |
| WO | WO 99/64352 | 12/1999 |

* cited by examiner

COMPUTER-IMPLEMENTED SYSTEM FOR CREATING A PUBLICATION AND METHOD THEREOF

RELATED APPLICATION

This application is a continuation-in-part of U.S. patent application Ser. No. 11/099,321, filed Apr. 4, 2005 now abandoned, which is a continuation of Ser. No. 09/419,360, now U.S. Pat. No. 6,931,591, filed on Oct. 15, 1999, both of which are hereby incorporated by reference.

FIELD OF THE TECHNOLOGY

This disclosure relates generally to the field of publishing, and relates more particularly to computer-implemented systems for creating a publication and methods of the same.

DESCRIPTION OF THE BACKGROUND

In the field of print advertising, there are specific channels through which merchants produce advertisements. Typically, a merchant or a dealer who wishes to create a particular print advertisement turns to Co Op Ad books supplied by the manufacturers. In these Co Op Ad books, manufacturers provide pre-approved company logos, trademarks, graphics, and other relevant promotional materials to be used in advertising campaigns, local ads, and other print media. As a result, manufacturers experience significant costs in maintaining the materials supplied to the merchants or dealers and exert very little control in how the materials are utilized. Overall, this type of marketing program is expensive to maintain and update, difficult to use by the merchants or dealers, and difficult for the manufacturers to monitor compliance by the merchants or dealers. Furthermore, once the proper layout of the advertisement has been completed, there exists the difficult task of getting the hard copy to the printers for publishing.

Several computer implemented systems exist for creating advertisements and publications. However, these computer-implemented systems limit the ability of merchants and manufactures to create robust and dynamic publications or advertisements.

Accordingly, it would be highly desirable to develop a computer implemented system to facilitate content providers in making available images, templates, and layouts that meet their specification available to merchants and other publication creators.

BRIEF DESCRIPTION OF THE DRAWINGS

To facilitate further description of the embodiments, the following drawings are provided in which.

Figure 1:
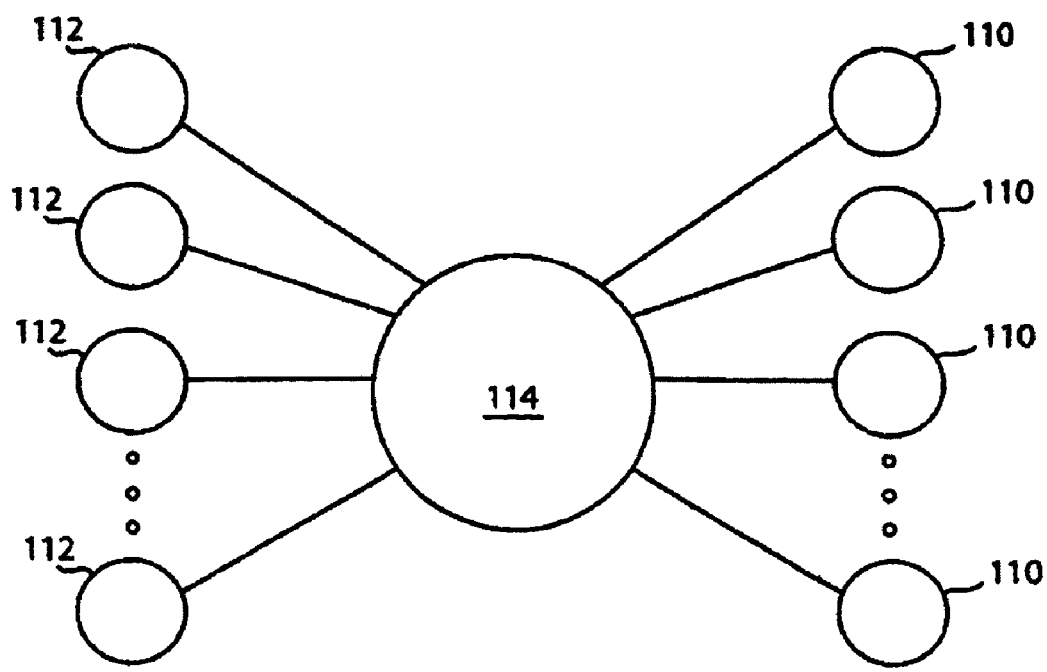
FIG. 1 is a schematic representation of an embodiment of a computer network through which a publishing process can be implemented, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, system, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The terms "couple," "coupled," "couples," "coupling," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant.

DETAILED DESCRIPTION OF EXAMPLES OF EMBODIMENTS

In a number of embodiments, a computer-implemented system can be configured to facilitate creation of a publication from a master template, one or more embedded templates, and one or more content components. The computer-implemented system can include: (a) an administrative toolkit having: (1) a template creation module configured to create and allow editing of the master template and the one or more embedded templates at a development site accessible to a template creator; (2) a content management module configured to establish rules regarding editing of the master template and placing the one or more content components in the master template; (3) an embedded template management module configured to establish rules regarding the editing of the one or more embedded templates, placing the one or more embedded templates in the master template, and the placing of the one or more content components in the one or more embedded templates; and (4) a template inventory management module configured to copy the master template from the development site to a production site accessible to an end-user.

In other embodiments, a computer system can lay out a publication from a master template, at least one first implanted template, at least one second implanted template and one or more content components. The master template, the at least one first implanted template and the at least one second implanted template can each include two or more template regions. The computer apparatus can include: (a) a template definition and editing module to facilitate the template creator at a development site to: (1) create and edit the master template, the at least one first implanted template and the at least one second implanted template; (2) establish guidelines governing placement of the one or more content components and the at least one first implanted template into the two or more template regions of the master template; (3) embed the at least one first implanted template into the master template; and (4) embed the at least one second implanted template in the at least one first implanted template; (b) a content input management module configured to facilitate the template creator to input the one or more content components; (c) a template inventory management module for copying the master template, the at least one first implanted template, and the at least one second implanted template from the development site to a production site accessible to an end-user; (d) an end-user interface configured to facilitate the end-user to populate the master template, the first implanted template, and the second implanted template with content in accordance with the guidelines established by the template creator.

In yet another embodiment, a method of creating a publication can include accessing a master template for the publication, the master template comprising at least one first text region, at least one first image region, and at least one first embedded template; placing one or more first images in the at least one first image region; placing first text in the at least one first text region; populating the at least one first embedded template, where each of the at least one first embedded templates have at least one second text region and at least one second image region; and placing second text in the at least one second text region. Populating the at least one first embedded template can include placing one or more second images in the at least one second image region.

By way of example, embodiments are described in reference to advertising and the requirements between a manufacturer and its distribution channel. However, any publishing requirements established by any entity such as franchisers, distributors, insurance companies, mutual fund companies, etc., and each of the respective agents can take advantage of the embodiments described herein.

By way of example and not limitation, embodiments are described herein-below in reference to examples of deployments and implementations for advertisements and, more particularly, composing and publishing advertisements via an information exchange environment and, more particularly, the Internet environment. It is understood that the publishing concept of the embodiments described herein can be applied to publishing of materials of other nature, in any format or on any media, whether in an information network environment or otherwise. For example, the publishing concept described herein can be applied to publications such as advertisements, web pages, brochures, signs, posters, booklets, books, pamphlets, door hangers, billboards, overlays, iron-ons, stickers, cards, newsprint, binding, etc., in the form of prints, digital files, audio, audio files, video, video file, etc., which one party may wish to facilitate and control the scope and manner of the use of its contents for such publications. The content material composed for publication includes graphics that may include textual components, whether represented graphically or in character fonts. Hence, reference to graphics herein may include texts as well and vice versa.

Information Exchange Network

Embodiments can be implemented on various information sharing networks including, without limitation, distributed information exchange networks, such as public and private computer networks (e.g., the Internet, intranets, WAN (wide area network), LAN (local area network), etc.), value-added networks, communications networks (e.g., wired or wireless networks), broadcast networks, and a homogeneous or heterogeneous combination of such networks. These information exchange networks include both hardware and software and can be viewed as either, or both, according to which description is most helpful for a particular purpose.

For example, the distributed information exchange network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood that such networks and communications facility involve both software and hardware aspects.

A method or process is here, and generally, conceived to be a self-consistent sequence of steps or activities leading to a desired result. These steps or activities require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the described embodiments include, but are not limited to, general or specific purpose digital processing and/or computing devices, which devices may be stand alone devices or part of a larger system. The devices may be selectively activated or reconfigured by a program, routine and/or a sequence of instructions and/or logic stored in the devices. In short, use of the methods described and suggested herein is not limited to a particular processing configuration. Prior to discussing details of the inventive aspects of embodiments, it is helpful to discuss one example of a network environment in which the described embodiments can be implemented.

The Internet is an example of an information sharing or information exchange network including a computer network in which the embodiments can be implemented, as illustrated schematically in FIG. 1. Many servers 110 are connected to many clients 112 via Internet network 114, which includes a large number of connected information networks that act as a coordinated whole. Details of various hardware and software components included in the Internet network 114 are not shown (such as servers, routers, gateways, etc.). Further, it is understood that access to the Internet by the servers 110 and clients 112 can be via suitable transmission medium, such as coaxial cable, telephone wire, wireless RF (radio frequency) links, or the like. Communication between the servers 110 and the clients 112 can take place using an established protocol. As will be noted below, embodiments of the publishing system can be configured in or as one of the servers 110, which may be accessed by users and content providers via clients 112.

Figure 2:
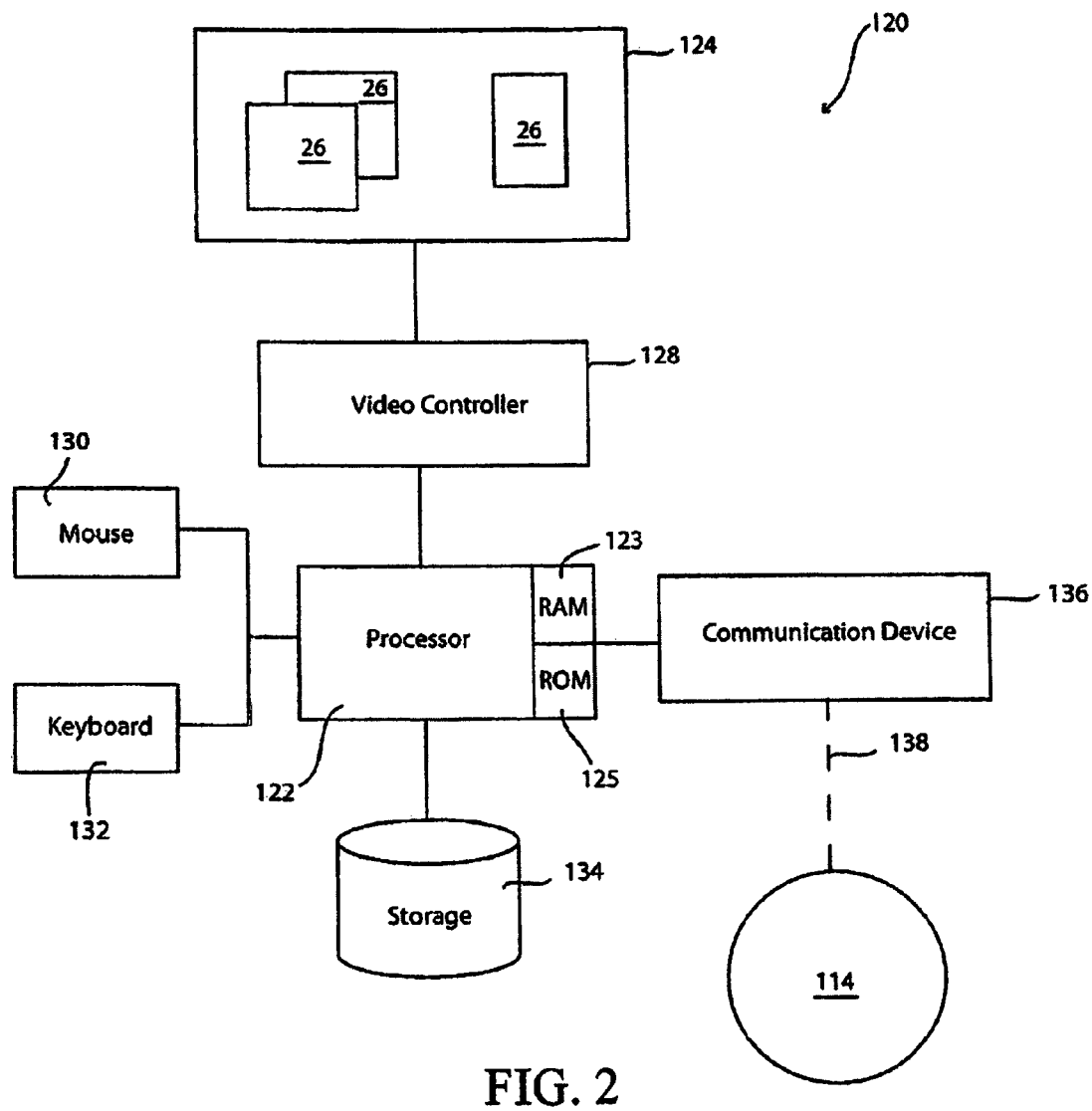
FIG. 2 is a schematic representation of an embodiment of a computer system that facilitates the publishing process, according to the first embodiment.

Turning now to FIG. 2, FIG. 2 illustrates schematically an embodiment of a computer system 120 which can be configured as the client 112 for navigating the Internet. The computer system 120 communicates with the Internet network 114. The computer system 120 includes a processor 122, internal random-access memory ("RAM") 123 and read-only memory ("ROM") 125, and a data bus architecture for coupling the processor 122 to various internal and external components. The computer system 120 further includes a communication device 36 which, in turn, is coupled to a communication channel 38 for effecting communication with the Internet network 114. A mass storage device 34, such as a hard disk drive or floppy disk drive of CD-ROM (compact disk read-only memory) drive, is coupled to the processor 122 for storing utility and application software (including a suitable web browser for navigating the Internet) and other data. The application software is executed or performed by the processor 122.

User actuatable input devices are also coupled to the processor 122, including a cursor positioning device 130 and a keyboard 132. The cursor positioning device 310 is representative of any number of input devices that produce signals corresponding to a cursor location on a display 124, and can include by way of example, a mouse, a trackball, an electronic pen, or a touch-pad, which may be an integral part of the keyboard 132. Display 124 is coupled to the processor 122 through a video controller 128. The video controller 128 coordinates the presentation of information on the display 124 in one or more windows 126. Generally, the windows 126 are scalable, thus permitting a user to define the size and location of a particular window of windows 126 on the display 124.

The servers 110 could also have similar components as the computer system 120 depicted in FIG. 2. The program configuration of the client 112 and servers 110 would be apparent given the disclosure of the desired functions of the client 112 and servers 110 disclosed herein below.

System Overview

Figure 3:
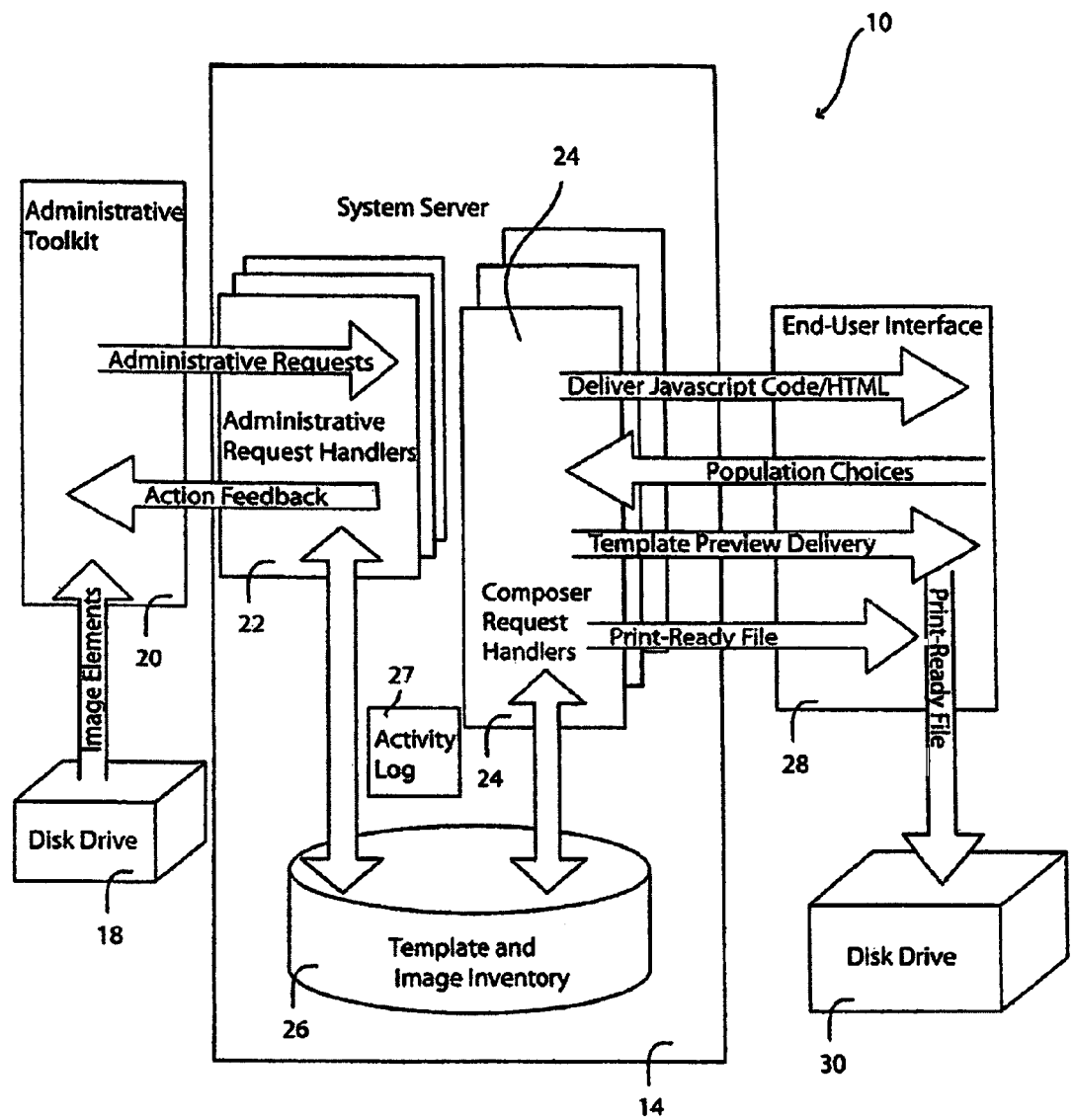
FIG. 3 is a schematic block diagram of the publication layout system, according to the first embodiment.

Embodiments of the publication layout system 10 will be described in reference to FIG. 3. The publication layout system 10 generally consists of three-party inter-operative components, namely, the administrative toolkit 20, the system server 14, and the end-user interface 28. The administrative toolkit 20 is the interface through which the content providers will provide company logos, trademarks, graphics, and other relevant materials. The system server 14 is the central unit that bridges the administrative toolkit 20 with the end-user interface 28. The system server 14 will actually store the various manufacturers' advertising materials as well as keep track of all of the merchants and dealers (i.e. the end-users) who have access to the end-user interface 28. As such the system server 14 will act as the brain of the overall publication layout system 10.

Figure 4:
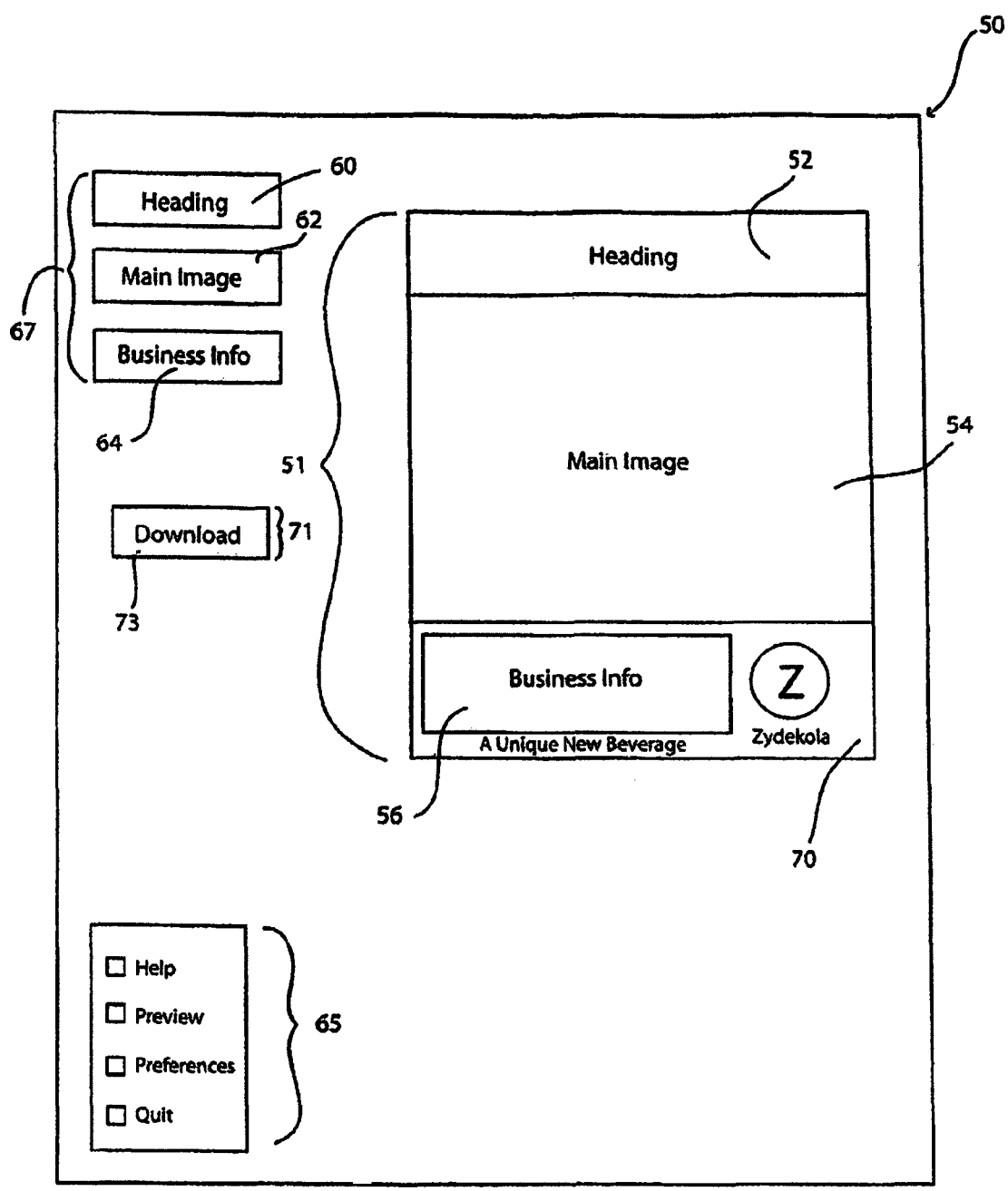
FIG. 4 is a diagram of the advertisement layout window, according to the first embodiment.

Not to be taken in a limiting sense, a simple example of the various parties involved in using the publication layout system 10 could include an automobile manufacturer as the content provider, the system manager, and the individual automobile dealerships as the end-user. The automobile manufacturer may have logos and trademarks, as well as pictures of cars in their company lineup and other advertising material prepared for distribution to the individual dealerships. Instead of collating such prepared material in print form for distribution, the automobile manufacturers would log onto the layout system 10 via the administrative toolkit 20 and upload all the necessary advertising materials to be accessed by the individual dealerships for various campaigns. The system server 14 would serve as a central location in which the end-users (individual automobile dealerships) could access materials in preparation for their weekly newspaper advertisements. The manufacturers are able to create/develop template designs for the dealers and merchants to use. These templates would be the outline of the pre-approved advertisements. Having been supplied by the manufacturers themselves, these templates would meet the specific standards and guidelines set by the manufacturers. Accessing these templates electronically, the dealerships would then be able to choose among the various content possibilities to go with these templates. These content possibilities are referred to as population choices. In FIG. 4, the window 50 is an example of what would appear to the dealership for the creation of the advertisement on a pre-defined template 70. The templates have particular regions for different parts of the advertisement. For example, the headline region 52, the main image region 54, and business information region 56 can be collated to create an advertisement depicted in FIG. 4. Each dealership would then "populate" a given region with the given content choices by selecting the "Headline" button 60, the "Main Image" button 62, and the "Business Info" button 64. These content choices would range from picking the correct font and point size of text to cropping particular pictures and images to go with a particular advertisement. Therefore, accessing the system server 14 via the end-user interface 28, each individual dealership would be able to tailor their advertisements following the guidelines and protocols set by the manufacturers. A relatively low-resolution image of the layout of the entire advertisement is created at the end-user interface 28. After such an advertisement is created following the guidelines set by the manufacturers and enforced by the system server 14, the advertisement is ready for publication by downloading a high-resolution file from the system server 14. In this manner, large high-resolution files representing the content need not be downloaded during the development stage of the advertisement, which would otherwise result in data traffic. The final high-resolution file is downloaded only when the advertisement has been finalized and accepted by the end-user.

Administrative Toolkit

The administrative toolkit 20 can be implemented in a client machine such as client 12 in FIG. 1 and FIG. 2. The administrative toolkit 20 handles all of the administrative functions within the publication layout system 10. Through the use of the administrative toolkit 20, content providers interface with the publication layout system 10 and set all of the required restrictions and guidelines of creating a print advertisement. The administrative toolkit 20 has access to media containing the layouts, advertising images, graphics, and text material, through its interface with the system server 14.

Figure 5:
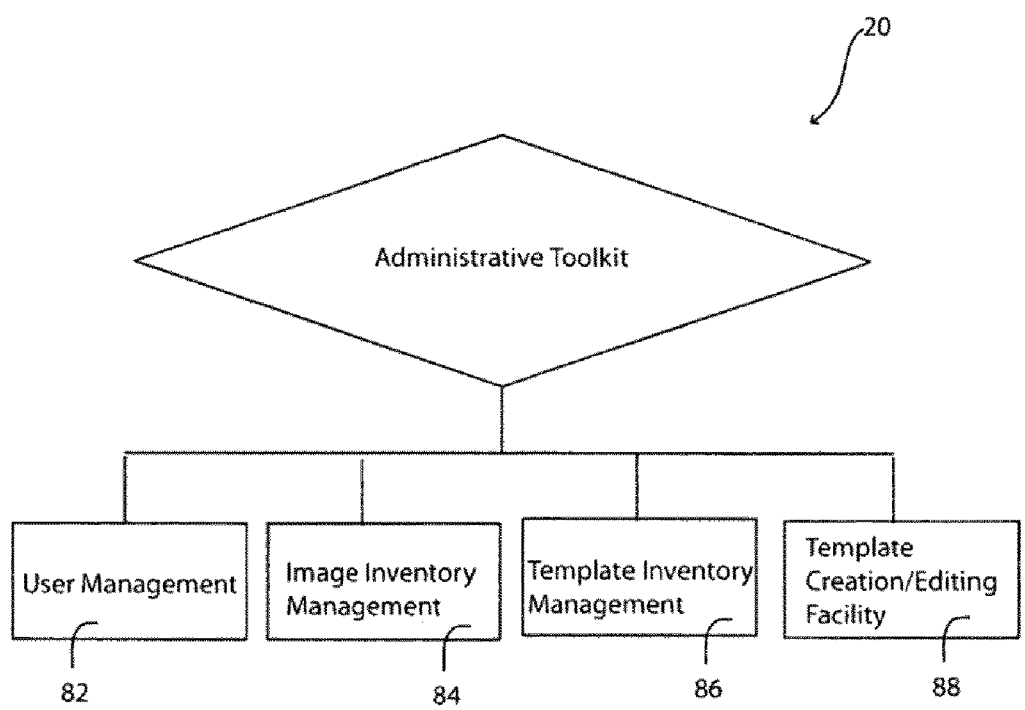
FIG. 5 is a schematic block diagram of the administrative toolkit, according to the first embodiment.

As shown in FIG. 5, the administrative toolkit comprises four modules: (1) the user management module 82; (2) the image inventory management module 84; (3) the template inventory management module 86; and (4) the template definition and editing module 88.

In the user management module 82, each user (e.g., the manufacturer) within the database is assigned an access level. There are five access levels, of which four levels are dedicated to the template creator supplying the advertising materials and guidelines and one is dedicated to the end-user (e.g., the merchants and dealers). Each level is granted varying scopes of access and functions within the publication layout system 10. The topmost level is the administrator level which allows the person to perform any action within the administrative toolkit 20. Such a person can view any template via the end-user interface 28, and avoid any restrictions attached to the template regarding downloading restrictions. Essentially, the administrator level sets the rules of the overall publication layout system 10 for a particular manufacturer. The next level down is the developer level which grants one all of the access of an administrator except user administration. The user administration function enables one to add/delete an authorized user from the publication layout system. In addition, the user administration function enables one to specify a particular user's level of access within the publication layout system.

The next level down is the manager level which allows one to access all of the developer functions except template creation/editing/layout. The last level on the manufacturer side is the approver level which allows one to approve and reject completed templates submitted by end-users. It is up to such an approver to monitor and control the advertising templates submitted by end-users. The approver has no further access to the overall publication layout system 10. On the other side, the merchants and dealers, for example, are granted the end-user status which allows one to access system server 14 via the end-user interface 28, but with download restrictions of completed advertising schemes within the layout approval subsystem.

The image inventory management module 84 allows manufacturers to create directories and sub-directories within the image inventory 26 of the system server 14. The image inventory 26 is accessed via interaction between the administrative toolkit 20 and the system server 14. Images can be uploaded into the image inventory 26. Upload also supports the dynamic decompression of previously compressed archives (preserving directory structure) into the image inventory 26. Integrity checks, such as steps to correct file formats, verify file extension match or mismatch, and identify file corrupt or non-corrupt, are performed on all images placed into the image inventory 26, with immediate feedback to the user upon failure of those tests. In some embodiments, the image inventory 26 can support EPS, PSD, GIF, JPG, and TIFF files, and other industry standard file formats from file conversion utilities, for the various images. Images can also be deleted within this module.

In the template inventory management module 86, template creators (e.g., one or more users with authorization of managers and above) can move to and from production and development areas of the publication layout system. This feature is extremely useful and convenient when certain changes or updates need to be implemented in the image inventory 26. For example, if a person with access status of manager or above wishes to implement changes in the image inventory 26 for a new line of products, she can first enter the development site to make necessary changes and experiment with new designs without ever affecting the production site. Once the changes have been satisfactorily implemented, she can replace the production site with the development site for instant update. Such instantaneous change allows for smooth transitions. Using the template inventory management module 86, one can delete templates. One can also check image references within any selected template for display to the developer.

Using the template definition and editing module 88, all layout templates, image resource population choices, and text rules and placements are defined. Creation and editing of templates are performed within a graphical layout environment similar in design to other popular layout software tools such as Quark Express and PageMaker. Rectangular regions are drawn on to a virtual page and rules applied which are enforced by the end-user interface 28. The purpose of this module is to define the exact placement, constraint ratios, text rules, page size, download restrictions, and region ordering (for purposes of interface presentation to an end-user). Common functionality supplied to the developer of each template (region grouping, copy paste functions, page setup/size, undo/redo functions, dynamic zoom and view percentages, etc.). At any point, a template can be saved to the server preserving all rules and placement for presentation for the end-user. In some embodiments, each template is comprised of any combination and placement of three main region types: (1) image region; (2) text region; and (3) frame region. Each of these three region types, except for the frame region, are labeled with a proper title (e.g., headline, main image, business contact information, etc.), so that the region can be easily recognized by the end-users within the composition interface.

Within the image region, the end-user can choose and populate the specific region at composition time from an image resource list. For example, a particular car dealership will be able to choose from an array of pictures taken for specific automobile to place on that specific region of the advertisement. Thus, if an automobile manufacturer provides five different shots of the same car but from different angles, the car dealership can choose the picture which he prefers to use in the local newspaper advertisement. The template creator can also fix a particular image into a region, such that the end user will have no choice about which image will be placed in the region. The developer also has the ability to allow a user to upload an image from his local hard drive to be placed into the region. The X/Y position within this image region can define the location within the page at which the image will be placed. In addition, the horizontal and vertical sizes will define the maximum amount of space an image will be allowed to occupy once specified. How large the image will actually appear within the region depends upon its justification rules selected for that region. The justification rules determine the size and aspect ratio that the placed image will appear. Justification rules are divided into horizontal and vertical justification rules as described below:

| HORIZONTAL | VERTICAL |
|---|---|
| CENTER: if the width of the placed image is less than the maximum allowed by the region's horizontal size, the image will be centered horizontally within the image region. | CENTER: If the height of the image is less than the maximum allowed by the region's vertical size, the image will be centered vertically within the image region. |
| LEFT: the image will be placed flush with the left most border of the region. | TOP: the image will be placed flush with the topmost border of the region. |
| RIGHT: the image will be placed flush with the rightmost border of the region. | BOTTOM: the image will be placed flush with the bottom most border of the region. |
| FULL: the system will attempt to scale the image so that both vertical edges are flush with the rightmost and leftmost vertical borders of the region. | FULL: The system will attempt to scale the image so that both horizontal edges are flush with the topmost and bottommost horizontal borders of the region. |

In all combinations except horizontal: FULL and vertical: FULL, the placed image will maintain its original aspect ratio. However, in the case where full justification is applied on both axes, the image will fit exactly to the size of the region, ignoring the aspect ratio of the original image.

Within the text regions, there are individual text lines, each of which can adhere to different set of properties. Each unique property for each unique text line can be optionally left "open" allowing the end-user to assign the property. The properties of the text regions can include as follows:

| | |
|---|---|
| FONT | Any font currently existing within the server environment can be chosen such that the text specified at population time will appear with that particular typeface. |
| POINT SIZE | Determines the point size that the particular text line will be drawn in. |
| LEADING | The amount of vertical space between lines of text. |
| JUSTIFICATION | CENTER, LEFT, RIGHT, or FULL |
| COLOR | Specified currently in a RGB value. |
| FIXED TEXT | This property allows the template developer to fix text into the line, effectively disallowing the end-user to specify any text of his own at composition time. The developer can format the fixed text in a fashion the placed "tags" within the text, allowing the end-user to "fill in the blanks," while disallowing modification of any text which is not blank. |

This property allows the template creator to fix text into the line, effectively disallowing the end-user to specify any text of his own at composition time. The template creator can format the fixed text in a fashion the placed "tags" within the text, allowing the end-user to "fill in the blanks," while disallowing modification of any text which is not blank.

A frame region is simply a square region which has a square frame, and an optionally filled background. The point size of the line frame can be of any width, and the background can also be optionally left transparent, such that the region behind the frame will show through. No options are available for the end-user to specify with regard to frame regions.

System Server

The system server 14 may be implemented in a server machine such as the server 14 in FIG. 1 and FIG. 2. The system server 14 orchestrates communication between the other process components of the overall publication layout system 10. The system server 14 operates behind, for example, a standard HTTP/1.1 (hypertext transfer protocol) server residing on a UNIX variant operating system. The system server 14 comprises four sub-systems: (1) the administrative request handlers 22; (2) the end-user request handlers 24; (3) template and image inventory 26; and (4) activity log database 27. The administrative request handlers 22 oversee all requests originating from the administrative toolkit 20. In addition, users of the publication layout system 10 are verified and access to the system is limited according to the various levels. The end-user request handlers 24 give the merchants and dealers the various image population choices, including the support for user uploadable image resources, and subsequently load the template information according to the population choices. The template and image inventory 26 is the storage management module. The activity log database 27 maintains a running log of all actions from both administrative user (e.g. manufacturers) and end-users (e.g. merchants and dealers).

End-User Interface

In some embodiments the end-user interface 28 may be implemented in a client machine such as the client 12 in FIG. 1 and FIG. 2. The end-user interface 28 has access to a storage media 30 that is capable of saving the print-ready files. The end-user interface 28 provides composition functionality to end-users. The end-users log on to the system server via an information exchange network, such as the Internet, using a unique user-id and a password. After logging-on to the system, the end-user has access to creating advertisements with the restrictions imposed by the administrator. Once a template is chosen by clicking a specially formatted link (within an HTML (hypertext markup language) page), the composition interface is initiated by the web browser. The web browser receives all of its client side code by requesting it from the server. Once all client code is loaded, the server is instructed to load the template chosen, and then is displayed within the browser. The interface is comprised of four main areas, each of which provides certain piece of functionality to the end-user. These four main areas include: (1) region menu 67; (2) template preview area 51; (3) action command area 65; and (4) download command area 71.

The region menu 67 includes a set of buttons 60, 62, and 64 that present all of the regions 52, 54, and 56 for which the end user must provide choices for region population. Each region within the template, which requires population by the end-user, will appear in the region menu 67 according to the region order list specified during template specification. Each region option is listed by its region title (e.g., Heading, Main Image, and Business Info) on the button. Upon selection of a region by clicking on the corresponding button, a second window will be presented to the user with the image options available to him according to the template specification. The user can select by clicking on the desired image option. As the user progresses through all of the regions, a graphical display will indicate which of the regions have been populated, and which ones remain unspecified. If, for example, when the main image region 54 is selected by clicking the corresponding button 62, a window will pop up on the front of the window and present all of the possible image choices in thumbnail fashion. When an image is located and selected, it will populate the region 54 within the template 70 constrained by all of its properties assigned at time of specification. In the event that the template developer requested that the end-user be allowed to upload his own image into the region, an interface will be provided to the end-user enabling him to navigate their local hard-drive and select an image to upload. If, for example, the business info (text) region 56 is selected, the window will present an HTML form allowing the end-user to specify all text and optional properties for that region.

After each of regions 52, 54, and 56 are populated with end-user supplied choices, the template preview area 51 can be configured to be automatically updated to reflect the newly supplied information. The preview area can optionally be flagged as "non-volatile," in which case it will not update unless a "preview" button is pressed within the Action Command Area 65. The preview serves as a "work in progress," and regions which have been populated will reflect those population choices. Regions 52, 54 and 56 which have yet to be supplied with data by the end-user will appear as gray boxes in the exact position and size of the region as drawn out in the administrative template creation tool. As such, the gray boxes will act as placeholders until the end-user makes the population choices. Once the user has completely specified all choices for all regions, the preview serves as a true representation (albeit at low resolution) of the final image file which can then be downloaded or submitted for approval.

The action command area 65 consists of four buttons labeled: (1) preview; (2) preferences; (3) help; and (4) quit. The end-user's clicking of the preview button immediately updates the template preview area to reflect all currently supplied population choices. The preferences choice currently presents the end-user with preview zoom level and non-volatile preview update choices. The help button takes the user to a dynamically-linked help page. The quit function enables the end-user to exit the composition interface and to immediately close all windows of the interface.

The download command area 71 will be available to the end-user in the case that the template creator has specified that any fully populated template can be immediately downloaded by the end-user. In such a case, a "download" button 73 will appear after the first population choice has been made and previewed. Pressing the button 73 will present the end-user with a choice regarding the format of the final high-resolution print ready file. In some examples, the choices include PDF, EPS, and TIFF. Once the choice is made and submitted, the server will be requested to encapsulate all resources such as the fonts, images, and layout into the final image file. The end-user will then be presented with the ability to navigate his hard-drive, locate a directory to place the file, and then download the print-ready file to his hard drive. All print-ready files are automatically compressed to expedite the download process over slow connections. In the case that the template developer placed an "approval" restriction on the template, the final compositions must be submitted for approval. Thus, instead of a "download" button, a "submit layout" button is placed within the download action area. Once pressed, the approver will be notified that a particular advertisement populated with end-user's choices is awaiting approval. The end-user will be given feedback indicating that the image has been submitted for approval, and will have to wait for the approver to agree that the image meets pre-defined specifications. At this point, the approver can view the image, make edits to the composition using the same end-user interface, or reject the advertisement. In the case of approval, the end-user will be sent a piece of e-mail indicating the new acquired "approved" status and a special URL (uniform resource locator) to go and download his image (at this point all of the same download options will be available to the end-user). In the case of rejection, the end-user will also be notified via e-mail, and a special URL will be supplied allowing him to return to his composition in progress, make necessary edits/changes, and resubmit the changes into the approval process once again. After the approval, the advertisement is ready for printing. In addition, the downloaded version can be used for other outputs as well, such as Internet banner advertisements.

Figure 6:
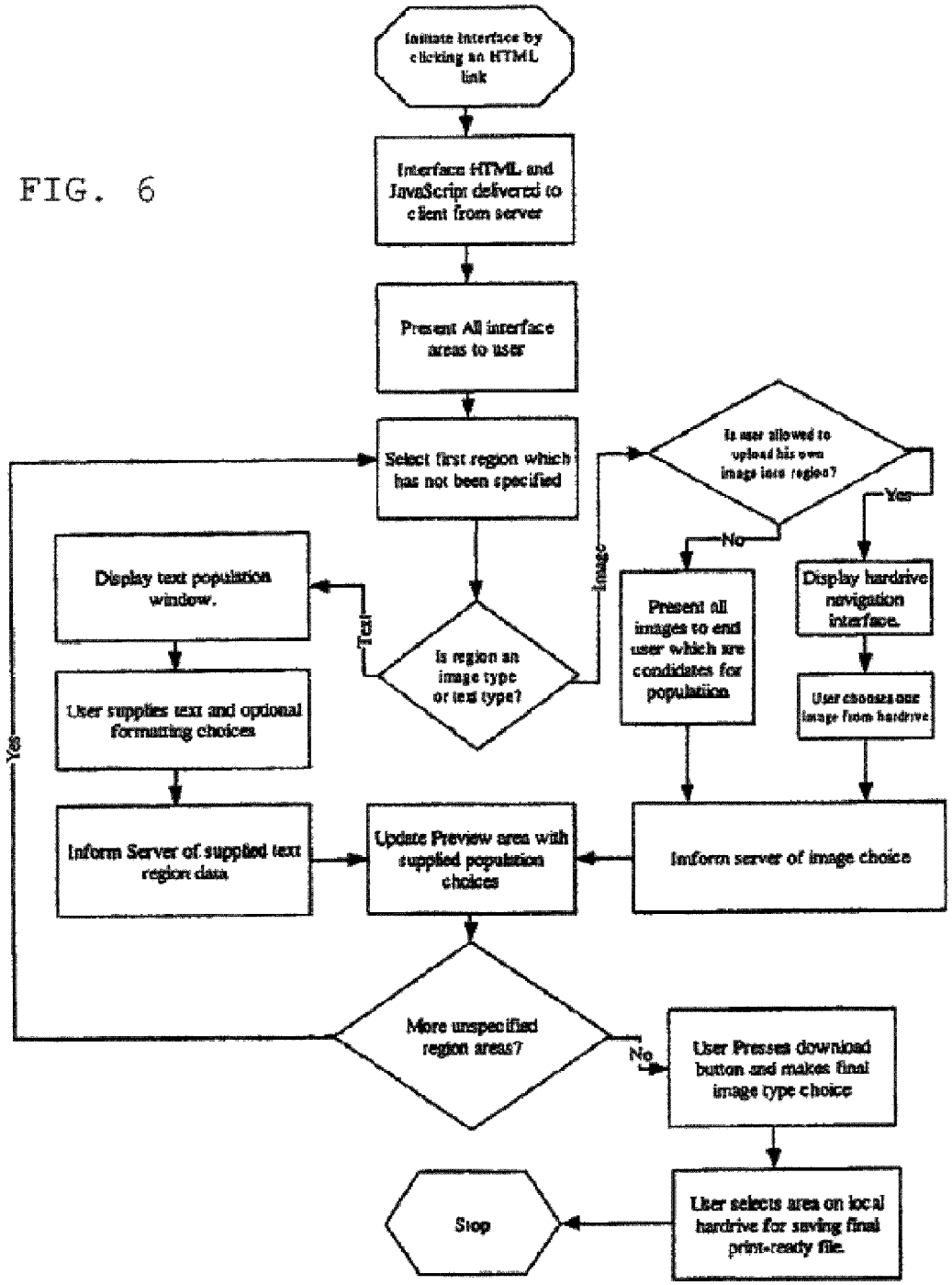
FIG. 6 is a flow chart representation of the processes via the end user composition interface, according to the first embodiment.

FIG. 6 depicts the flow process handled by the end user interface for composing the publication material (e.g., advertisements in our example above). The flowchart provides additional details to the general functional description of the interface above.

Figure 7:
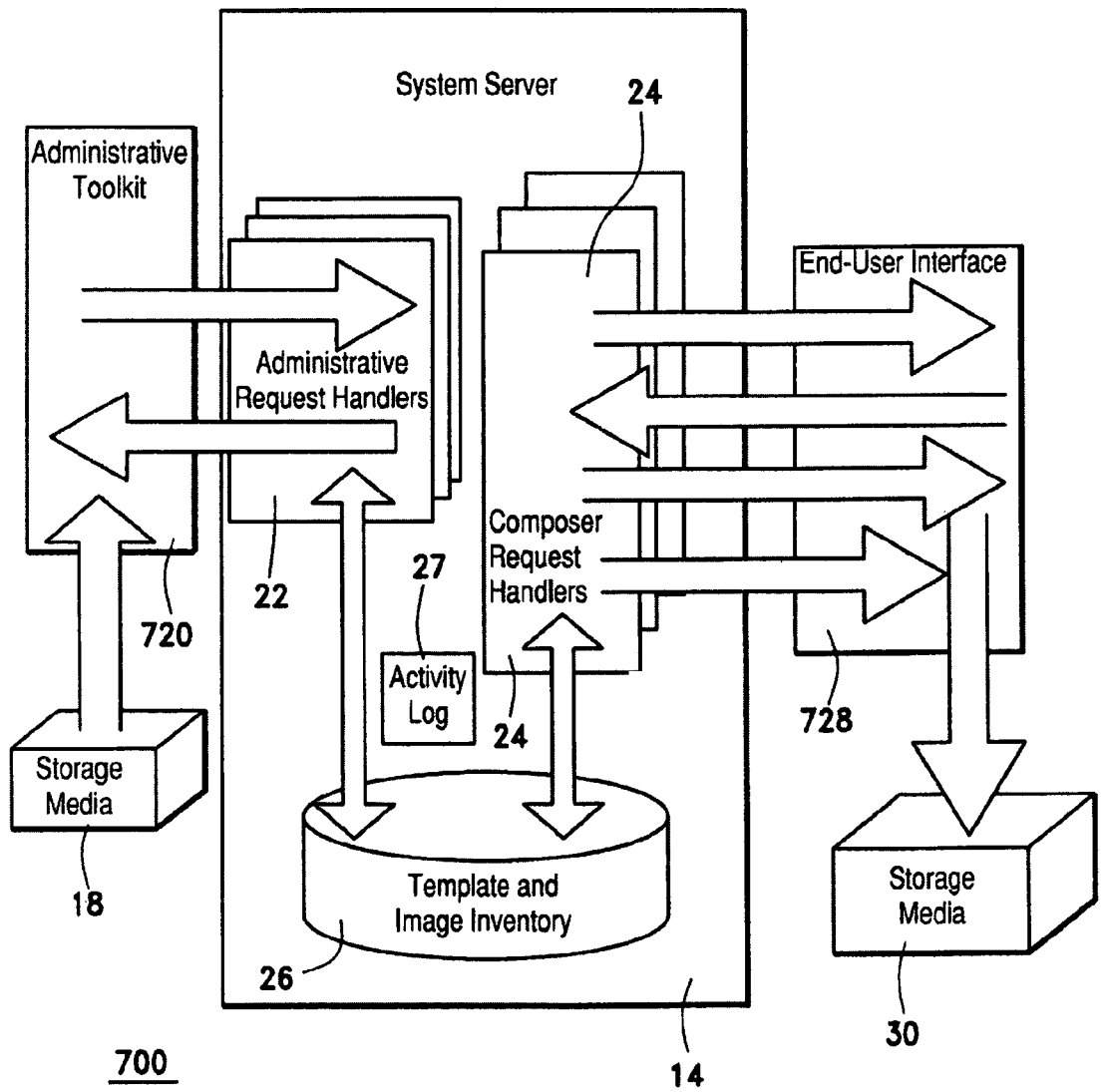
FIG. 7 is a schematic block diagram of a publication layout system, according to a second embodiment.

Turning to another embodiment, FIG. 7 is a schematic block diagram of a publication layout system 700, according to a second embodiment. In some examples, system 700 can be considered a computer-implemented system configured to facilitate creation of a publication or a computer apparatus for laying out a publication. In the embodiments illustrated in FIG. 7, system 700 can include: (a) an administrative toolkit 720; (b) system server 14; (c) storage media 18 and 30; and (d) an end-user interface 728.

Not to be taken in a limiting sense, a simple example of using system 700 could consist of a restaurant chain franchisor as the template creator, content provider, and system manager. In this example, an individual franchisee of the restaurant chain could be the end-user. The franchisor can have logos, trademarks, as well as pictures of the food and the food packaging and other advertising material prepared for distribution to the individual franchisees.

Instead of collating such prepared material in print form for distribution, the franchisor would log onto system 700 via administrative toolkit 720 and upload all the necessary advertising materials to be accessed by the individual franchisee. System server 14 would serve as a central location in which the end-users (e.g., the individual franchisees) could access materials in preparation for the advertisements. The franchisor can create/develop template designs for the franchisee to use. These templates could include a master template that would be the outline of the pre-approved advertisements. The master template could include embedded templates (e.g., a coupon template) as subsections of the advertisements. For example, the master templates could give the franchisee the option to include a coupon or a picture of an item on the restaurant's menu in one area of the advertisement. If sales are strong in his restaurant, a franchisee might not want to include the coupon. However, if a franchisee wants to try to increase sales by including a coupon tailored to his specific restaurant, the master template would give the franchisee this option.

Having been supplied by the franchisor itself, these templates would meet the specific standards and guidelines set by the franchisor. Accessing the master templates electronically, the franchisee would then be able to choose among the various content possibilities to place inside of the master templates. Accordingly, accessing the system server 14 via the end-user interface 728, each individual franchisee would be able to tailor his advertisements following the guidelines and protocols set by the franchisor.

System 700 can be configured to create a master template with one or more embedded templates. Each template, whether master or embedded, can include two or more template regions. Based on the type of content to be placed in the template region, the template creator can designate each of the template regions as: (a) a text region; (b) a frame region; (c) a content component region; (d) an embedded template region; or (e) a variable content region.

Content component regions are regions where one or more content components can be placed by the end-user. That is, the end-user can choose and populate the specific region at composition time from a list of components. In some examples, content components include visually perceptible images, text files, videos files, and audio files. When the content component is a visually perceptible image, the content component regions can be similar or identical to image regions. If the publication being created is, for example, a webpage or video, the end-user could place an audio file, a hyperlink, or a video file in the content component region.

Embedded template regions are regions where one or more embedded or implanted templates can be placed by the end-user. That is, the template creator can designate one or more templates that the end-user can place in this region in the example franchisor/franchisee example, the franchisor could designate a region of the master template to be an embedded template region and give the franchisee a choice of different coupon templates to place in the region (e.g. a template for a french fry coupon or a template for a milkshake coupon). In some examples, the embedded template regions follow the same justification rules as the template region.

Variable content template regions are regions where the end-user is given a choice as to the type of content to be placed in the region. The end-user can choose to populate a specific region at composition time with a choice of media types (e.g., text, images, or embedded templates). After the user chooses the type of media to place in the variable region, the region will be governed by the rules for that region type and any additional limitation placed on the region by the template creator. In the franchisor/franchisee example, the region where the user can choose to place a coupon or an image is a variable content region. In other examples, the end-user can be given the choice of placing text in a variable content region.

Figure 8:
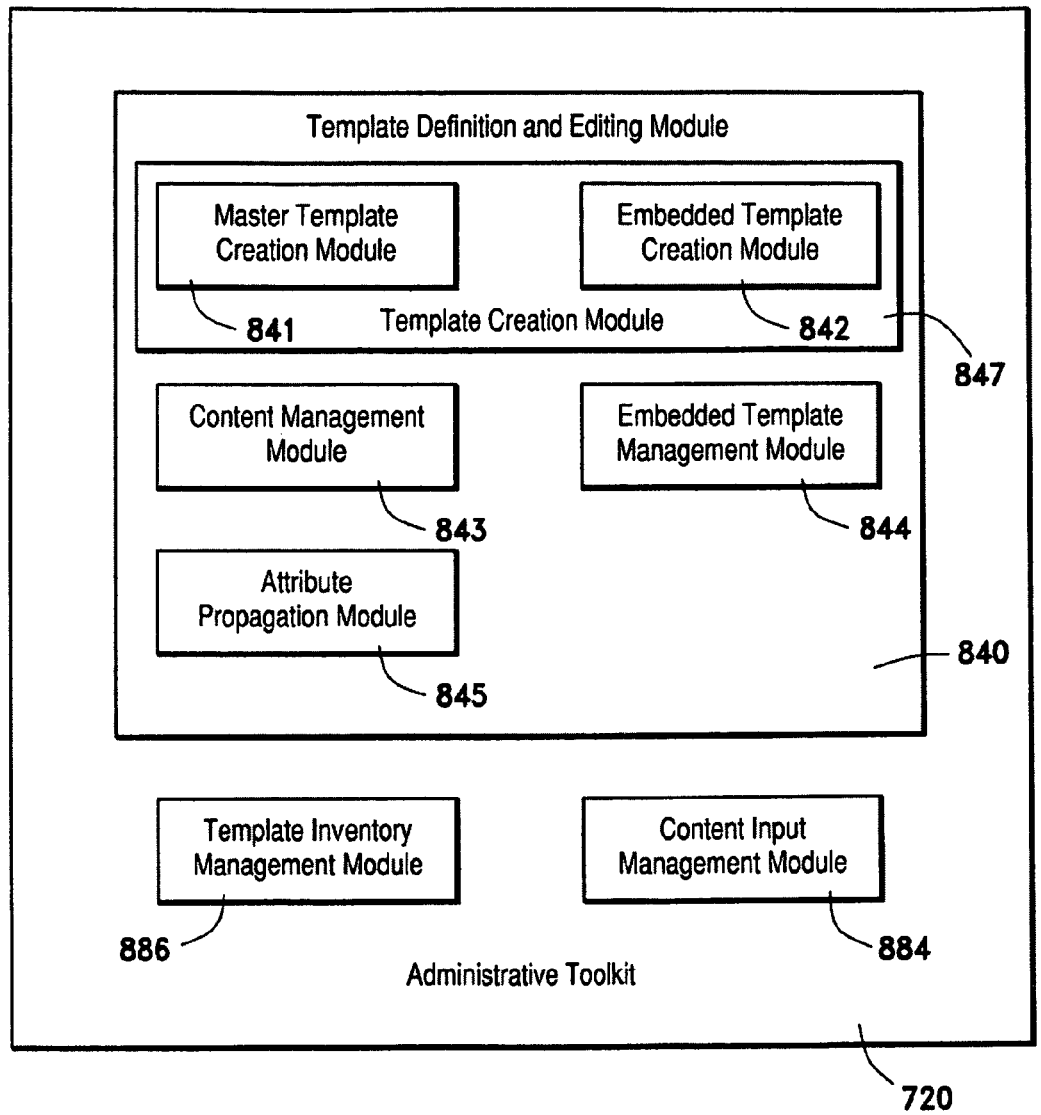
FIG. 8 is a schematic block diagram of the administrative toolkit of the publication layout system of FIG. 7, according to the second embodiment.

FIG. 8 is a schematic block diagram of administrative toolkit 720, according to the second embodiment. In some examples, administrative toolkit 720 can include: (a) a content input management module 884; (b) a template inventory management module 886; and (c) a template definition and editing module 840.

Content input management module 884 can be configured to facilitate the template creator in inputting the content components. In some embodiments, content input management module 884 can be similar or identical to image inventory management module 84 as illustrated in FIG. 5.

Template inventory management module 886 (FIG. 8) can be similar to template inventory management module 86 (FIG. 5) except it also facilitates the uploading of embedded templates.

Template definition and editing module 840 in FIG. 8 can be configured to facilitate the template creator at a development site to: (a) create and edit the master and embedded templates; (b) establish guidelines governing placement of content components and the embedded templates in the master template; (c) embed embedded templates into the master template; and (d) embed embedded templates in other embedded templates. Template definition and editing module 840 can be similar to template creation/editing facility 88 (FIG. 5), albeit with additional or expanded functionality.

In some examples, template definition and editing module 840 can include: (a) master template creation module 841; (b) an embedded template creation module 842; (c) a content management module 843; (d) an embedded template management module 844; and (e) an attribute propagation module 845.

Master template creation module 841 can be configured to create and allow editing of the master template at a development site by the template creator. Moreover, master template creation module 841 can be configured to create a master template that allows the end-user to decide whether to place content components or embedded templates in specified regions of the master template. Master template creation module 841 is further configured to allow one or more attributes be assigned to the master template.

Content management module 843 is configured to establish rules and allow the template creator to establish rules regarding editing of the master template and the placement of content components in the master template.

Embedded template creation module 842 can be configured to create and allow editing of embedded templates at the development site by the template creator. The embedded templates, created using embedded template creation module 842, can be placed inside of the master template or other embedded templates. That is, embedded template creation module 842 is configured to facilitate the template creator to embed a first embedded template into a second embedded template.

Embedded template creation module 842 is further configured to create embedded templates such that the end-user can decide whether to place a content component or another embedded template in specified regions of the embedded template. Embedded template creation module 842 is further configured to allow one or more attributes be assigned to the master template.

Embedded template management module 844 is configured to establish rules or allow the template creator to establish rules regarding: (a) the editing of the embedded templates; (b) the placement of embedded templates in the master template; and (c) the placement of content components in the embedded templates.

In some examples, master template creation module 841 and embedded template creation module 842 are combined into a template creation module 847. In the same or different embodiment, template creation module 847 does not differentiate between master and embedded templates. In some examples, a template can be both a master and a embedded, and vice versa. In various examples, embedded template management module can also be included in template creation module 847.

Attribute propagation module 845 can be configured to propagate the attributes of the master template to embedded templates. Furthermore, attribute propagation module 845 is further configured to propagate attributes of a first embedded template to other templates. That is, attribute propagation module 845 can transfer contents, characteristic, value, settings, and/or attributes between templates. For example, a master template can use a specific background color and text color. Attribute propagation module 845 could, automatically or when instructed by a user, transfer these settings to templates embedded in the master template. In another example, an embedded template could have a specified justification rule. Attribute propagation module 845 could transfer this justification rule to other embedded templates. In the same or different embodiments, attribute propagation module 845 can transfer attributes between regions of a template or between content components in the templates.

Referring again to FIG. 7, end-user interface 728 can be configured to allow the end-user to: (a) access the master template after it has been copied to the production site; (b) access and edit the one or more embedded templates; (c) populate the one or more embedded templates with the content components in accordance with the rules established the embedded template management module 844 (FIG. 8); (d) edit the master template and populate the master template with the content components in accordance with the rules established using content management module 843 (FIG. 8) and embedded template management module 844 (FIG. 8); and (e) choose whether to place embedded templates or a content components into variable regions in the master template or another embedded template.

In some embodiments, end-user interface 728 can be similar to end-user interface 28 (FIG. 3) and allow access by the end-user at a second location remotely located from the first location over an information exchange network after the master template has been copied to the production site.

Figure 9:
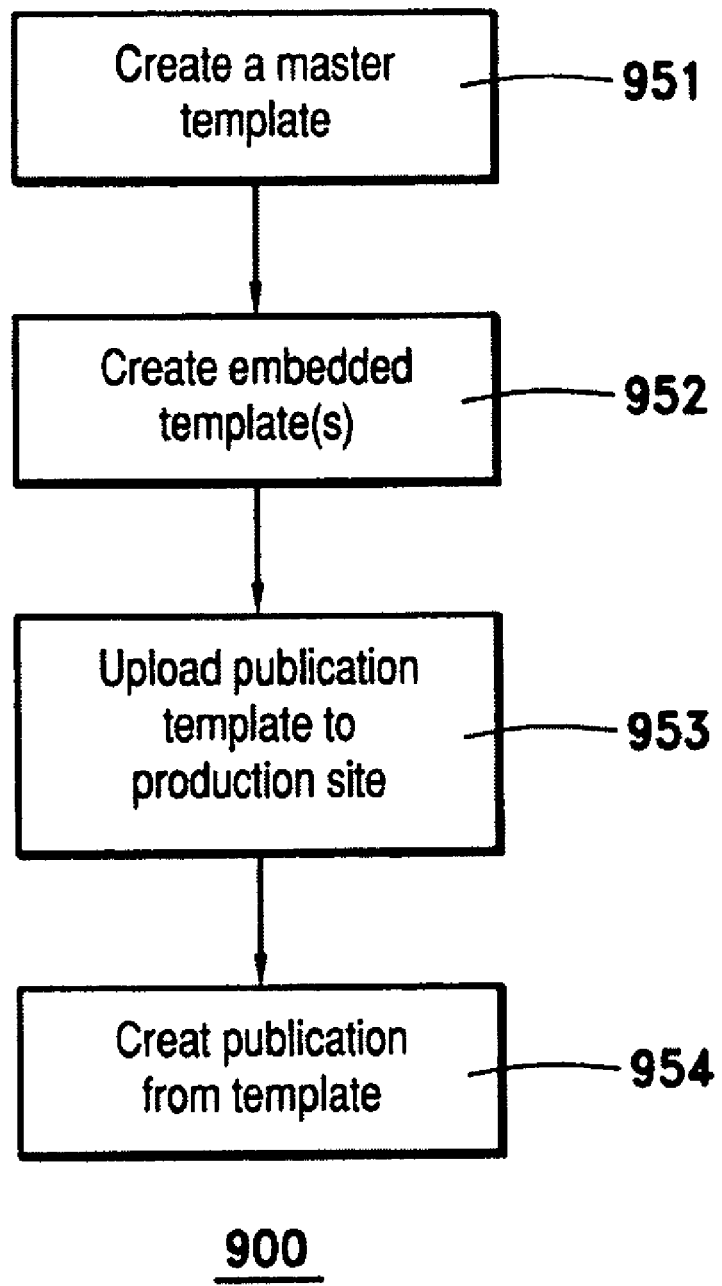
FIG. 9 illustrates a flow chart of a method of creating a publication, according to the second embodiment.
Figure 10:
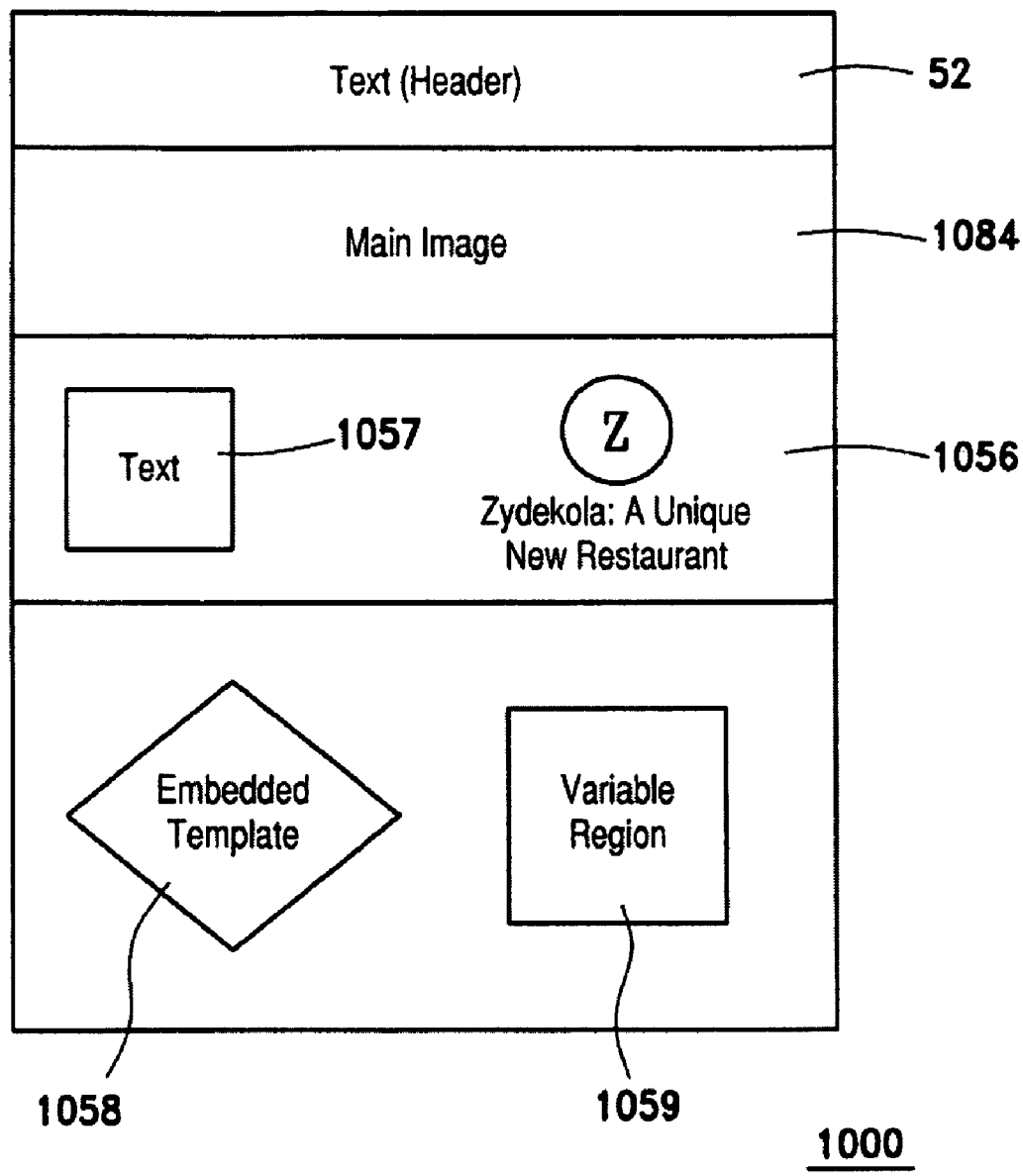
FIG. 10 illustrates an example of a master template, according to the second embodiment.

FIG. 9 illustrates a flow chart of a method 900 of creating a publication, according to the second embodiment. FIG. 10 illustrates an example of a master template 1000, according to the second embodiment. Method 900 (FIG. 9) will be explained with reference to master template 1000. Method 900 (FIG. 9), administrative toolkit 720 (FIG. 7) and master template 1000 are merely exemplary, and method 900 (FIG. 9) and administrative toolkit 720 (FIG. 7) are not limited to only creating and using master template 1000. Method 900 (FIG. 9) and administrative toolkit 720 (FIG. 7) can be employed in many different sequences, embodiments, or examples not specifically depicted or described herein.

Figure 11:
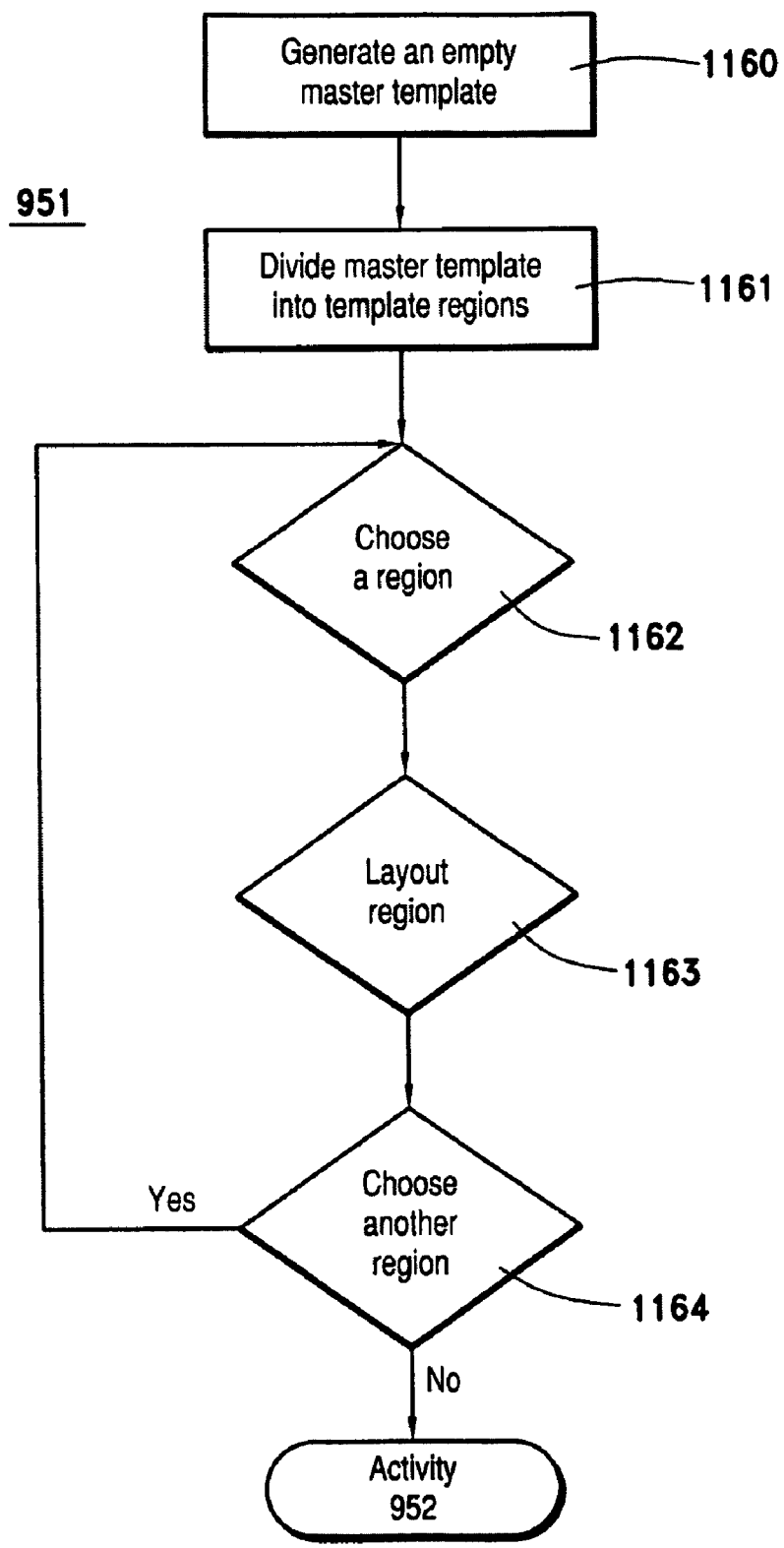
FIG. 11 illustrates a flow chart of an activity of creating the master template, according to the second embodiment.

Referring again to FIG. 9, method 900 includes an activity 951 of creating a master template. In one example, the master template created in activity 951 can be master template 1000 (FIG. 10). FIG. 11 illustrates a flow chart of activity 951 of creating the master template, according to the second embodiment.

Referring to FIG. 11, activity 951 includes a procedure 1160 of generating an empty master template. In this procedure, the template creator creates a new master template or opens a previously created template. As part of generating the empty master template, the template creator can choose the dimensions, shape, background color, justification rules, fonts, etc., of the master template based on the type of publication. In some examples, master template creation module 841 (FIG. 8) can be used to generate the empty master template.

The next procedure in activity 951 is a procedure 1161 of dividing the template into two or more regions. Each template can be comprised of a combination the following region types: (a) content component regions; (b) text regions; (c) frame regions; (d) embedded template regions; and (e) variable content regions. In some example, master template creation module 841 (FIG. 8) can control the procedure of dividing the template into two or more regions.

In the example illustrated in FIG. 10, the master template 1000 is divided into five regions: text regions 52 and 1056, image region 1084, embedded template region 1058, and variable region 1059.

Referring again to FIG. 11, the next procedure in activity 951 is a procedure 1162 of choosing a region. In this procedure, one of the two or more template regions is chosen. In some examples, the region is chosen by the template creator. In other examples, content management module 843 (FIG. 8) chooses a region for the template creator. In the example illustrated in FIG. 10, the template creator or content management module 843 (FIG. 8) can choose one of regions 52, 1084, 1056, 1058, and 1059.

Subsequently, activity 951 in FIG. 11 includes a procedure 1163 of laying out the chosen region. In this procedure, the template creator creates or designs the chosen region. That is, the template creator can establish rules regarding editing and placing of text, embedding templates, and content components in the chosen region.

For example, referring again to FIG. 10, if the chosen region is text region 1056, the template creator can enter the text "Zydekola: A Unique New Restaurant" into text region 1056 and designate region 1057 as a text region where the end-user can enter text (i.e., embed a text region in a text region). Additionally, the template creator could also add notes or comments to tell the end-user what type of text to enter into region 1057. For example, the template creator could note that the address of the restaurant should be placed in region 1057. In some embodiments, the template creator could configure the region such that the notes added by the user could pop-up when the end-user moves his computer cursor over region 1057 when the template is shown in end-user interface 728 (FIG. 7).

If the chosen region is text region 52, the template creator could create a list of possible headers to be placed in text region 52 or designate the region such that the end-user can choose the text to enter. In some examples, a window can pop-up in end-user interface 728 (FIG. 7) that allows the end-user to select a header from the list of possible headers. In other examples, the template creator can configure text region 52 such that a drop-down box appears in end-user interface 728 (FIG. 7) that allows the end-user to select the header.

In another example, the chosen region is main image region 1084. In one embodiment, the template creator can insert an image into region 1084. In other embodiments, the template creator can designate two or more images that the end-user can choose to place in region 1084. In further embodiments, the template creator can designate region 1084 such that the end-user can insert any image.

In yet another example, the chosen region is embedded template region 1058. In this example, if the embedded template has already been created, the template creator can just upload the template into region 1058. If the embedded template has not been created, the template creator can create the embedded template in an activity 952 (FIG. 9) after the template creator has finished creating the master template. In other embodiments, a window will automatically open when the template creator edits region 1058, and the template creator can create the embedded template immediately in this window.

In still another example, the chosen region can be variable region 1059. In this example, the template creator can designate potential region types and potential content components for variable region 1059. For example, the template creator could designate region 1059 as either a text region or image region and specify the text or images that a user could use to populate region 1059.

In another example, the template creator could designate region 1059 as either an image region or embedded template region. In this example, the template creator could designate the images or embedded templates that could be used to populate region 1059. In the franchisee/franchisor example, the template creator could give the franchisee the choice to place either a picture of a food item or a coupon in region 1059. In some embodiments, the franchisor could designate one or more images of food items and one or more coupon templates that could be chosen by the franchisee.

Referring again to FIG. 11, the next procedure in activity 951 is a procedure 1164 of deciding whether another region needs to be laid out. If all of the regions of the master template have not been chosen, the next procedure in activity 951 is procedure 1162 of choosing a region. If all regions of the master template have already been chosen, activity 951 is complete and the next activity in method 900 of FIG. 9 is activity 952. In some embodiments, the template creator can save the partially created template at this point and finish laying out the rest of the master template at another time.

Figure 12:
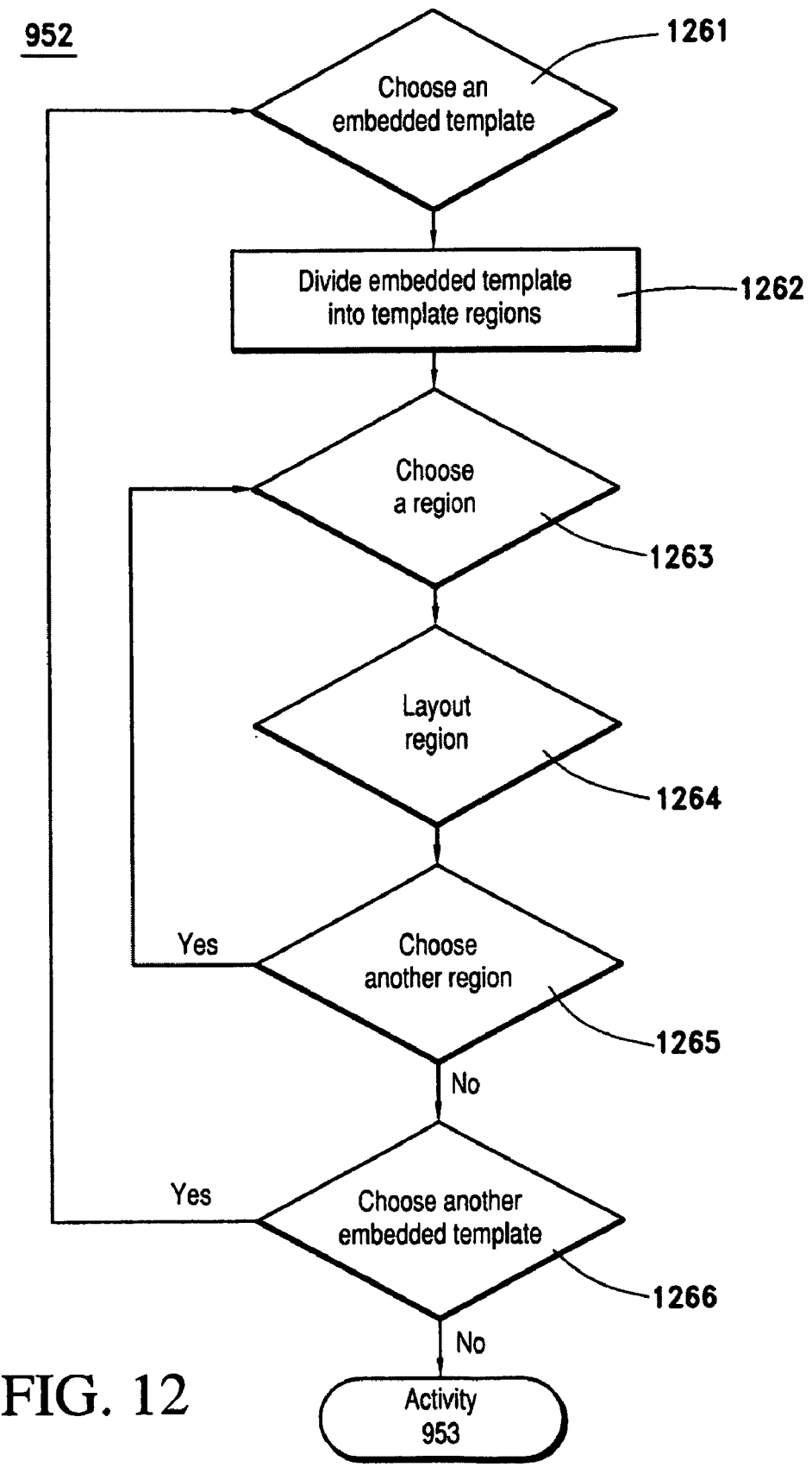
FIG. 12 illustrates a flow chart of an activity of creating one or more embedded templates, according to the second embodiment.

Referring back to FIG. 9, method 900 of FIG. 9 continues with activity 952 of creating the one or more embedded templates. FIG. 12 illustrates a flow chart of activity 952 of creating one or more embedded templates.

The first procedure in activity 952 is a procedure 1261 of choosing an embedded template. In some examples, two or more templates were embedded in the master template and the template creator or embedded template creation module 842 (FIG. 8) chooses one of the templates. For example, in master template 1000 (FIG. 10), the template creator designated region 1058 (FIG. 10) as a template region and gave the end-user an option of placing a template in region 1059 (FIG. 10). In this example, the template creator or embedded template creation module 842 (FIG. 8) would choose one of the two embedded templates to create. In the same or different embodiments, embedded template creation module 842 (FIG. 8) can facilitate the choosing of an embedded template by the template creator or can choose the embedded template for the template creator.

After an embedded template is chosen, the next procedure in activity 952 is a procedure 1262 of dividing the chosen embedded template into one or more regions. In some embodiments, procedure 1262 can be identical or similar to procedure 1161 of FIG. 11.

Subsequently, activity 952 includes a procedure 1263 of choosing a region. In some embodiments, procedure 1263 can be identical or similar to procedure 1162 of FIG. 11. In the same or different embodiments, embedded template creation module 842 (FIG. 8) can facilitate the choosing of a region by the template creator or choose the region for the template creator.

The next procedure in activity 952 is a procedure 1264 of laying out or creating the region. In some embodiments, procedure 1264 can be identical or similar to procedure 1163 of FIG. 11. In the same or different embodiments, embedded template management module 844 (FIG. 8) can facilitate the laying out of the region by the template creator. In some examples, as part of procedure 1264, the template creator can embed another template in the chosen template.

After laying out the chosen region in the chosen embedded template, the next procedure in activity 952 is a procedure 1265 of deciding whether to choose another region. In the same or different embodiments, embedded template creation module 842 (FIG. 8) can decide whether another region needs to be laid out. If all of the regions of the chosen template have not been created, the next procedure in activity 952 is procedure 1263.

If all of the regions of the chosen template have been laid out, the next procedure in activity 952 is a procedure 1266 of deciding whether any more embedded templates need to be created. If all of the embedded templates, including the embedded templates embedded in other embedded templates, have been created, activity 952 is complete and the next activity is an activity 953. If all of the embedded templates have not been created, the next procedure is procedure 1261 of choosing another embedded template to create.

After the template creator has finished creating the master template and any embedded templates, method 900 of FIG. 9 includes activity 953 of uploading the publication template to the production site from the development site. Publication template, as used herein, refers to the master template, any embedded templates, and any content components used in the master template or the embedded templates. In activity 953, uploading the publication template refers to uploading all or some of the items (master template, embedded templates, context components, etc.) that are needed to create the publication. In some examples, if one or more items have already been uploaded, these items do not need to be uploaded again.

By uploading the publication template, the template creator provides the publication template to the end-user. In some embodiments, the publication template is uploaded so the end-user can access the publication template over the Internet. In various examples, users with authorization of managers and above can copy the publication template from the development site to the production site using template inventory management module 886 (FIG. 8).

Figure 13:
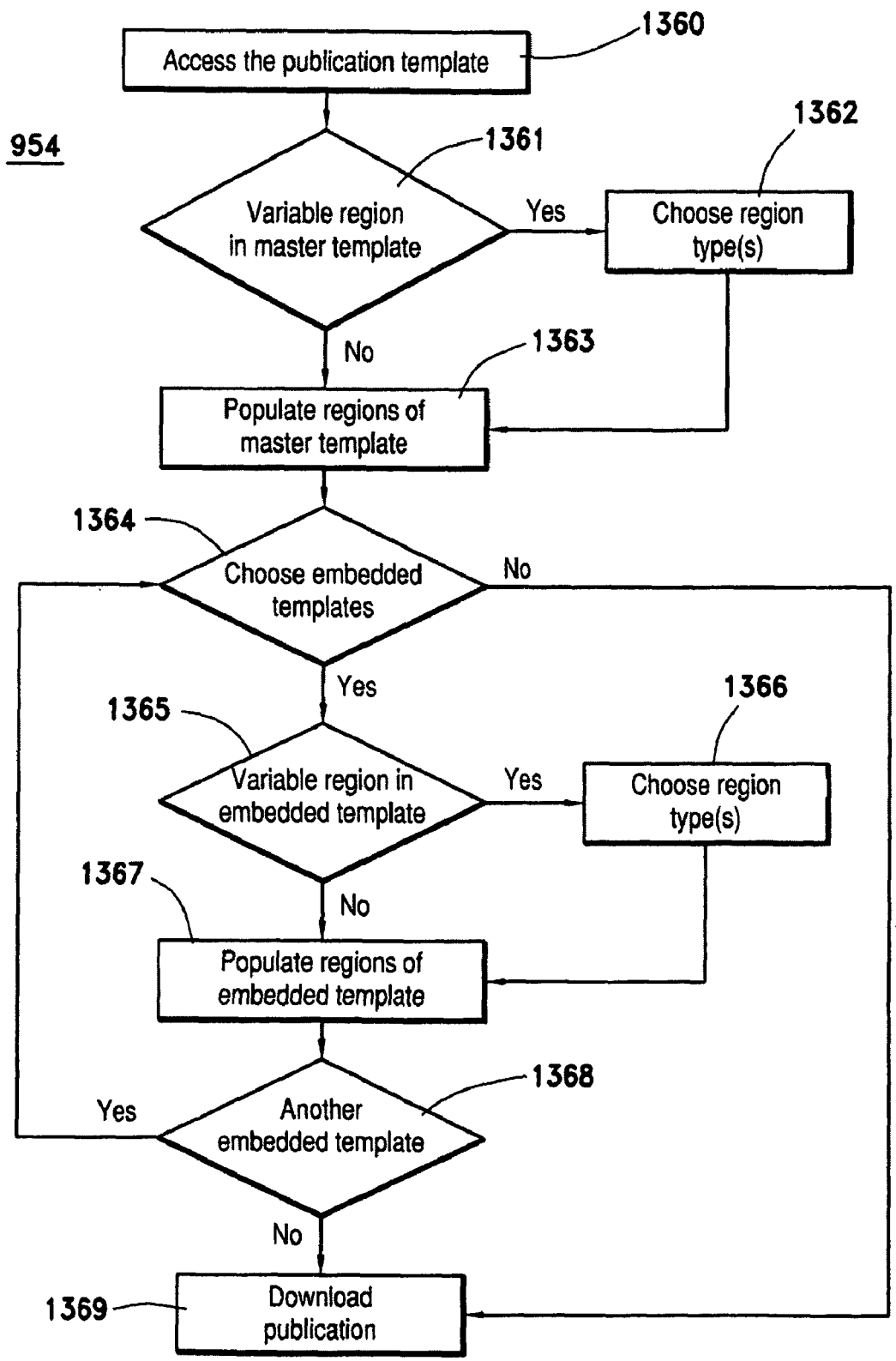
FIG. 13 illustrates a flow chart of an activity of creating the publication from the master template, according to a second embodiment.

Next, method 900 of FIG. 9 includes an activity 954 of creating the publication from the master template. FIG. 13 illustrates a flow chart of activity 954 of creating the publication from the master template, according to a second embodiment.

Referring to FIG. 13, the first procedure in activity 954 is a procedure 1360 of accessing the master template. In some embodiments, the end-user can access the master template using end-user interface 728 (FIG. 7). In many examples, the master template can also be accessed using end-user interface 728. Accessing end-user interface 728 can be similar or identical to the accessing using end-user interface 28 (FIG. 3).

Figure 14:
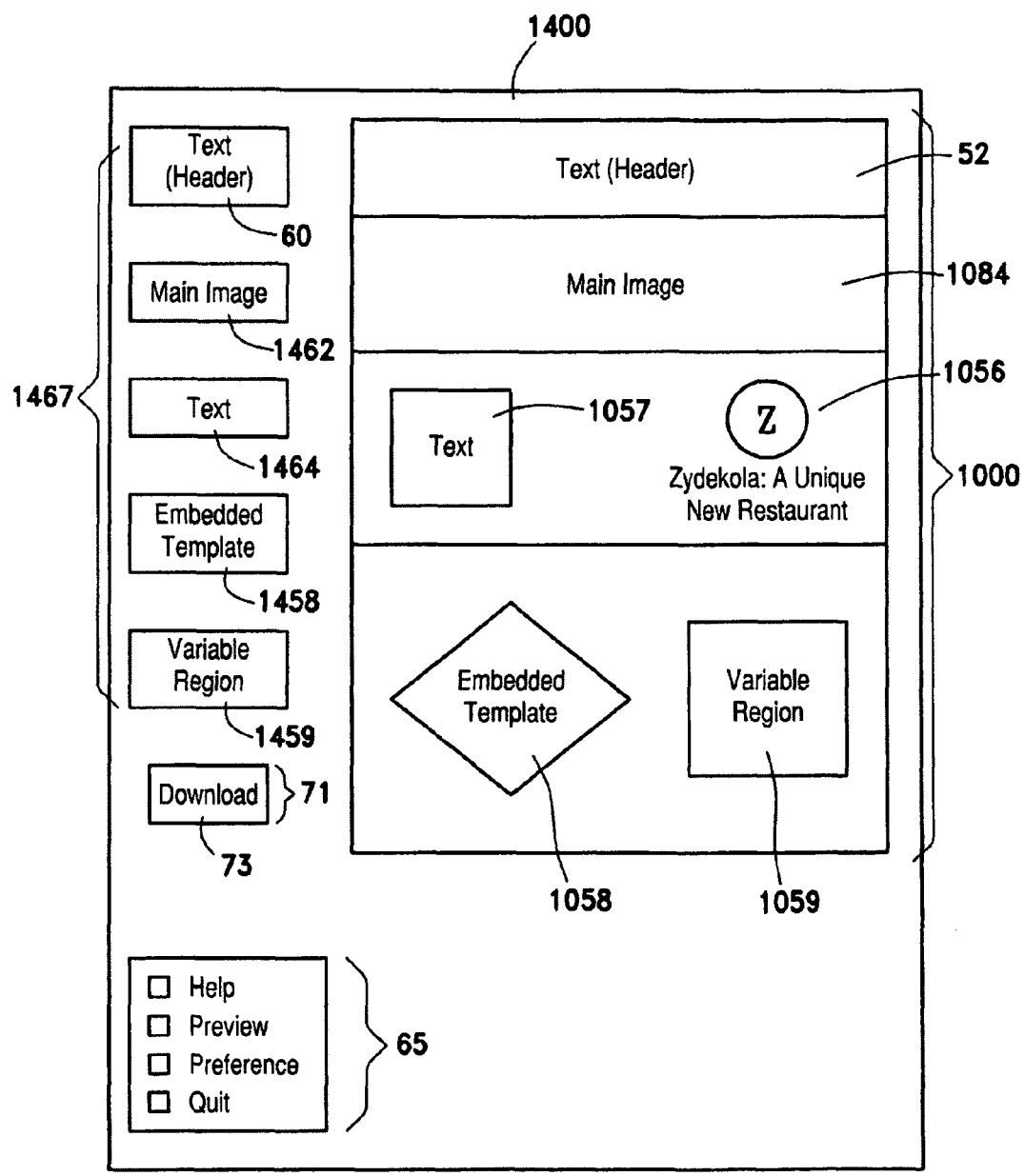
FIG. 14 illustrates an example of a publication layout window of an end-user interface, according to the second embodiment.

For example, the end-user can log on to system server 14 (FIG. 7) via an information exchange network using a unique user-id and a password. After logging-on to the system server 14, the end-user has access to master templates. Once a master template is chosen by clicking a link or a menu within a web page, the end-user interface 728 is initiated by the web browser. The web browser receives all of its client side code by requesting it from the server, if necessary. In some embodiments, once all client code is loaded, the server is instructed to load the master template chosen, and the master template is displayed within a publication layout window. FIG. 14 illustrates an example of advertisement or publication layout window 1400 of end-user interface 728, according to the second embodiment.

Referring again to FIG. 13, activity 954 includes a procedure 1361 of deciding whether the master template has any variable regions. If the master template includes variable regions, the next procedure in activity 954 is a procedure 1362. If the master template does not have any variable regions, the next procedure in activity 954 is a procedure 1363.

Procedure 1362 of activity 954 includes choosing the region type for any variable region types in the master template. In the example illustrated in FIG. 14, master template 1000 includes variable region 1059. In some embodiments, the end-user can click on button 1459 in menu 1467. When the user clicks button 1459, a second window will appear that allows the end-user to select the region type from a list, and the labels of button 1459 and region 1059 will change to reflect the selection. If additional variable regions exist, the end-user can click on the buttons corresponding to the region and select the type.

Referring back to FIG. 13, after the variable region types have been specified, the next procedure in activity 954 is a procedure 1363 of populating the image and text regions of the master template. In the example illustrated in FIG. 14, the end-user can click on buttons 60, 1462 and/or, 1464 in menu 1467 to select a region to populate. Upon selection of a region, another window will be presented to the end-user with the population options (e.g., images, text, etc.) available. The end-user can click on the option of his choice. As the end-user progresses through all of the regions, a graphical display can indicate which of the regions have been populated and which one remained unspecified.

In one example, the end-user can place a first image in region 1084 of master template 1000 and place text in regions 52 and 1056. Also, the user can populate region 1059 if the user wants to placed text or images in region 1059.

After the end-user has populated the text and image regions of the master template, the next procedure in activity 954 is a procedure 1364 for deciding whether any embedded templates need to be populated and, if so, to choose an embedded template. If the master template does not include an embedded template or none of the embedded templates need to be populated, the next procedure in activity 954 is a procedure 1369.

If templates embedded in the master template or embedded in other embedded templates still need to be populated, a window can automatically open that allows the end-user to populate the embedded template(s), and the next procedure in activity 954 is a procedure 1365 of deciding whether the chosen embedded template includes any variable regions. If the chosen embedded template includes variable regions, the next procedure in activity 954 is a procedure 1366. If the chosen embedded template does not have any variable regions, the next procedure in activity 954 is a procedure 1367.

Procedure 1366 of activity 954 includes choosing the region type for any variable region types in the chosen embedded template. Procedure 1366 can be similar or identical to procedure 1362.

After the variable region types have been chosen, the next procedure in activity 954 is procedure 1367 of populating the image and text regions of the chosen embedded template. Procedure 1367 can be similar or identical to procedure 1363.

Subsequently, activity 954 includes a procedure 1368 of deciding if any other embedded templates need to be populated. In some examples, the master template can include more than one embedded template and/or templates can be embedded in other embedded templates. If other embedded templates need to be populated, the next procedure in activity 954 is procedure 1364.

If all of the embedded templates have been populated, the next procedure in activity 954 is procedure 1369 of downloading the publication. After the master template and any embedded templates are populated, the publication is created, and the end-user can download the publication. In the embodiment illustrated in FIG. 14, layout window 1400 can include a download command area 71 with a button 73. The end-user can press button 73 to finalize and download the publication. In other embodiments, the publication must be approved by someone with approval level access before it is downloaded so button 73 can be configured to submit the publication for approval.

In some embodiments, procedure 1363 can be performed before procedures 1361 and 1362. In the same or different embodiments, procedures 1364 through 1368 can be performed before procedures 1361, 1362, and 1363. In the same or different embodiments, the end-user can decide the order that the regions are populated. For example, in the embodiment shown in FIG. 14, the end-user can pick from menu 1467 which regions to populate, so the order that regions (variable, text, embedded, etc.) are populated can be any order chosen by the end-user.

The processes, systems, and apparatuses of the embodiments have been described above in terms of functional modules in block diagram format. It is understood that unless otherwise stated to the contrary herein, one or more functions may be integrated in a single physical device or a software module in a software product, or a function may be implemented in separate physical devices or software modules, without departing from the scope and spirit of the present invention.

While the invention has been described with respect to the described embodiments in accordance therewith, it will be apparent to those skilled in the art that various modifications and improvements may be made without departing from the scope and spirit of the invention. For example, the publishing process can be easily modified to accommodate the situation in which users compose and publish content provided online by a content provider, in any format or in any media. Instead of end-user interface 28 (FIG. 4) or 728 (FIG. 7), other forms of user interface can be adopted without departing from the scope and spirit of the invention. For example, a menu driven interface may be designed to give a user a selection of content components for the user to compose a publication. The user selects from the content listing the components she desires to create a publication having parameters consistent with the layout and rule set defined by the content provider. Alternatively, a form based user interface may be designed to present a list of questions to be answered by the user. The answers would be based to retrieve the appropriate content components from the system server to compose a publication having parameters consistent with the layout and rule set specified by the content provider.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

The described embodiments are of the best presently contemplated mode of carrying out the invention. This description is made for the purpose of illustrating the general principles of the embodiments and should not be taken in a limiting sense.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented system configured to facilitate creation of a publication from a master template, one or more embedded templates, and one or more content components, the computer-implemented system comprising:
   an administrative toolkit comprising:
      a template creation module configured to create and allow editing of the master template and the one or more embedded templates at a development site accessible to a template creator, the template creation module is further configured to allow one or more attributes be assigned to the master template;
      an attribute propagation module configured to propagate at least a first attribute of the one or more attributes of the master template to one of the one or more embedded templates;

a content management module configured to establish rules regarding editing of the master template and placing the one or more content components in the master template;

an embedded template management module configured to establish rules regarding the editing of the one or more embedded templates, placing the one or more embedded templates in the master template and placing the one or more content components in the one or more embedded templates;

a template inventory management module configured to copy the master template from the development site to a production site accessible to an end-user; and an end-user interface configured to allow the end-user at the production site to populate the one or more embedded templates with the one or more content components in accordance with the rules established by the template creator using the content management module and the embedded template management module, wherein:

the template creation module and embedded template management module are different from the end-user interface;

the template creation module is further configured to create the master template such that the master template allows the end-user to decide whether to place at a first region of the master template one of: (1) a first content component of the one or more content components; or (2) a first template of the one or more embedded templates; and the template creation module is further configured to create the master template such that the end-user must place one of the first content component of the one or more content components or the first template of the one or more embedded templates at the first region of the master template.

2. The system of claim 1, wherein:
the end-user interface is configured to further allow the end-user at the production site to:
(a) access the master template after it has been copied to the production site;
(b) edit the master template and populate the master template with the one or more content components in accordance with the rules established using the content management module and the embedded template management module.

3. The system of claim 1, wherein:
the template creation module is further configured such that the template creator can embed a second template of the one or more embedded templates in a third embedded template of the one or more embedded templates.

4. The system of claim 1, wherein:
the first content component of the one or more content components comprises a visually perceptible image; and
the first template of the one or more embedded templates comprises a coupon template.

5. The system of claim 1, wherein:
the template creation module is further configured to create the first template of the one or more embedded templates that allows the end-user to decide whether to place at a first region of the first template of the one or more embedded templates: (1) the first content component of the one or more content components; or (2) a second template of the one or more embedded templates.

6. The system of claim 1, wherein:
the template creation module is further configured to facilitate dividing of the first template of the one or more embedded templates into one or more regions and designating a region type for each of the one or more regions.

7. The system of claim 1, wherein:
the template creation module is configured to create the master template that allows the end-user to decide whether to place at a second region of the master template: (1) a second template of the one or more embedded templates; or (2) a third template of the one or more embedded templates.

8. The system of claim 1, wherein:
the attribute propagation module is further configured to propagate one or more attributes of a second template of the one or more embedded templates to a third template of the one or more embedded templates.

9. A computer system for laying out a publication from a master template, at least one first implanted template, at least one second implanted template and one or more content components; the master template, the at least one first implanted template and the at least one second implanted template each comprise two or more template regions, the computer system comprising:

a template definition and editing module to facilitate a template creator at a development site to:
create and edit the master template, the at least one first implanted template and the at least one second implanted template;
establish guidelines governing placement of the one or more content components and the at least one first implanted template into the two or more template regions of the master template;
embed the at least one first implanted template into the master template; and
embed the at least one second implanted template into the at least one first implanted template;

a content input management module configured to facilitate the template creator to input the one or more content components;

a template inventory management module for copying the master template, the at least one first implanted template, and the at least one second implanted template from the development site to a production site accessible to an end-user; and an end-user interface configured to facilitate the end-user to populate the master template, the at least one first implanted template, and the at least one second implanted template with content in accordance with the guidelines established by the template creator, wherein:
the content comprises text entered by the end-user and the one or more content components.

10. The computer system of claim 9, further comprising:
a content components inventory management module configured to facilitate the template creator to input the one or more content components.

11. The computer system of claim 9, wherein:
the end-user interface is further configured to allow the end-user to choose whether to place at least one third implanted template or a first content component of the one or more content components into a first region of the one or more regions of the master template.

12. The computer system of claim 9, wherein:
the template creator is located at a first location; and
the end-user interface is further configured to be accessed by the end-user at a second location remotely located from the first location over an information exchange network after the master template, the at least one first implanted template, and the at least one second implanted template have been copied to the production site.

* * * * *